US008101002B2

(12) United States Patent
O'Connell et al.

(10) Patent No.: US 8,101,002 B2
(45) Date of Patent: Jan. 24, 2012

(54) FRONT ACCESS FRAME SEALING MECHANISM FOR FILTER CASSETTES (75) Inventors: Keiron O'Connell, Louisville, KY (US); Jeffrey T. Deye, Louisville, KY (US); Robert C. McNeill, Georgetown, IN (US)

(73) Assignee: AAF-McQuay Inc., Louisville, KY (US)

( * ) Notice: Subject to any disclaimer, the term of this patent is extended or adjusted under 35 U.S.C. 154(b) by 0 days.

(21) Appl. No.: 13/156,528

(22) Filed: Jun. 9, 2011

(65) Prior Publication Data

US 2011/0232241 A1 Sep. 29, 2011

Related U.S. Application Data (62) Division of application No. 11/626,171, filed on Jan. 23, 2007.

(60) Provisional application No. 60/761,191, filed on Jan. 23, 2006.

(51) Int. Cl.
*B01D 46/00* (2006.01)

(52) U.S. Cl. ............... 55/493; 55/480; 55/481; 55/502; 55/506; 55/484

(58) Field of Classification Search ............ 55/480–481, 55/483–484, 490–493, 501–507, DIG. 31; 74/567; 312/296
See application file for complete search history.

(56) References Cited

U.S. PATENT DOCUMENTS

| | | |
|---|---|---|
| 2,762,660 A | 9/1956 | Bullock |
| 3,350,862 A | 11/1967 | Nutting |
| 3,434,269 A | 3/1969 | Hyatt |
| 3,581,476 A | 6/1971 | Rivers |
| 3,593,503 A | 7/1971 | Andrews |
| 3,608,283 A | 9/1971 | Higlo |
| 3,626,668 A | 12/1971 | Cardiff |
| 3,630,008 A | 12/1971 | Revell |
| 3,693,328 A | 9/1972 | Paucha |
| 3,740,934 A | 6/1973 | Shuler |
| 3,788,046 A | 1/1974 | Kaeppler et al. |
| 3,789,589 A | 2/1974 | Delany et al. |
| 3,816,984 A | 6/1974 | Neumann |
| 3,993,464 A | 11/1976 | Pelabon |
| 3,999,969 A | 12/1976 | Shuler |
| 4,023,944 A | 5/1977 | Beane |
| 4,124,361 A | 11/1978 | Revell |

(Continued)

FOREIGN PATENT DOCUMENTS

DE 3502971 1/1986

(Continued)

*Primary Examiner* — Jason M Greene
*Assistant Examiner* — Karla Hawkins
(74) *Attorney, Agent, or Firm* — James E. Cole; John F. Salazar; Middleton Reutlinger (57) ABSTRACT A front access frame sealing mechanism for filter cassettes comprising at least one pair of posts extending inwardly from opposing sidewalls of a filter cassette housing wherein the posts have a head with a diameter exceeding that of the shaft of the post. At least one camming retainer is mounted adjacent each opposing sidewall about a post wherein each of camming retainer has a cam with a centrally oriented aperture with a diameter greater than the diameter of the post head for mounting about the posts. The cams have a flat portion and a extending handle portion, the flat portion becomes adjacent a sealing channel when in a sealing position. A sealing channel is adjacent each sidewall of the housing with a linear side adjacent front edges of at least one upstream filter cassette and having a channel holding each of the cams.

16 Claims, 7 Drawing Sheets

U.S. PATENT DOCUMENTS

| | | |
|---|---|---|
| 4,141,704 A | 2/1979 | Berglund |
| 4,217,122 A | 8/1980 | Shuler |
| 4,251,245 A | 2/1981 | Reynolds |
| 4,266,956 A | 5/1981 | Revell |
| 4,457,336 A | 7/1984 | Allan et al. |
| 4,486,204 A | 12/1984 | Marijnissen et al. |
| 4,498,914 A | 2/1985 | Ericksen |
| 4,521,234 A | 6/1985 | Peebles, Jr. et al. |
| 4,701,196 A | 10/1987 | Delany |
| 4,773,922 A | 9/1988 | Ross et al. |
| 4,790,865 A | 12/1988 | DeMarco |
| 4,827,901 A | 5/1989 | Jackson et al. |
| 4,838,598 A | 6/1989 | Hyde |
| 4,983,190 A | 1/1991 | Verrando et al. |
| 5,080,699 A | 1/1992 | Ho et al. |
| 5,221,302 A | 6/1993 | Sheehan |
| 5,332,409 A | 7/1994 | Dralle |
| 5,344,228 A | 9/1994 | Kovarik et al. |
| 5,399,180 A | 3/1995 | Kopp |
| 5,447,544 A | 9/1995 | Birdwell |
| 5,464,461 A | 11/1995 | Whitson et al. |
| 5,549,723 A | 8/1996 | Terry |
| 5,593,470 A | 1/1997 | Shagott et al. |
| 5,665,145 A | 9/1997 | Goodman et al. |
| 5,669,947 A | 9/1997 | Diachuk |
| 5,707,001 A | 1/1998 | Mark et al. |
| 5,733,350 A | 3/1998 | Muller et al. |
| 6,174,343 B1 | 1/2001 | Bloomer |
| 6,245,160 B1 | 6/2001 | Burns, Jr. et al. |
| 6,298,672 B1 | 10/2001 | Valicoff, Jr. |
| 6,322,178 B1 | 11/2001 | Dominique |
| 6,378,963 B1 | 4/2002 | Relyea et al. |
| 6,431,805 B2 | 8/2002 | Lanciaux, Jr. |
| 6,569,217 B1 | 5/2003 | DeMarco |
| 6,716,267 B2 | 4/2004 | Lawlor, Sr. |
| 6,848,760 B2 | 2/2005 | Thomas et al. |
| 6,974,491 B1 | 12/2005 | Kendall |
| 2002/0072020 A1 | 6/2002 | Crane et al. |
| 2004/0221555 A1 | 11/2004 | Engelland et al. |

FOREIGN PATENT DOCUMENTS

| | | |
|---|---|---|
| DE | 10349826 | 5/2004 |

FRONT ACCESS FRAME SEALING MECHANISM FOR FILTER CASSETTES

CROSS-REFERENCE TO RELATED APPLICATIONS

This divisional application claims priority to and benefit from, currently pending, U.S. patent application Ser. No. 11/626,171, filed on Jan. 23, 2007, which, under 35 USC §119(e), claims priority to and benefit from U.S. Provisional Application Ser. No. 60/761,191 titled "Front Access Frame Sealing Mechanism for Filter Cassettes", filed on Jan. 23, 2006, whose inventors are Keiron O'Connell, Jeffery T. Deye, and Bob McNeill. The disclosures of the applications are incorporated herein by reference in their entirety.

STATEMENT REGARDING FEDERALLY SPONSORED RESEARCH OR DEVELOPMENT

Not applicable.

FIELD OF INVENTION

The present invention relates to the sealing of filter cassettes within a housing wherein the cassette(s) are used in the filtration of a gas stream.

BRIEF DESCRIPTION OF THE DRAWINGS

Reference to the figures discloses several embodiments of the present invention and are not to be interpreted as limiting the scope of the invention disclosed herein.

DETAILED DESCRIPTION OF THE PREFERRED EMBODIMENTS

The following detailed description is given primarily for clearness of understanding and no unnecessary limitations are to be understood therefrom and modifications will become obvious to those skilled in the art upon reading the disclosure and may be made without departing from the spirit of the invention and scope of the appended claims.

Figure 1:
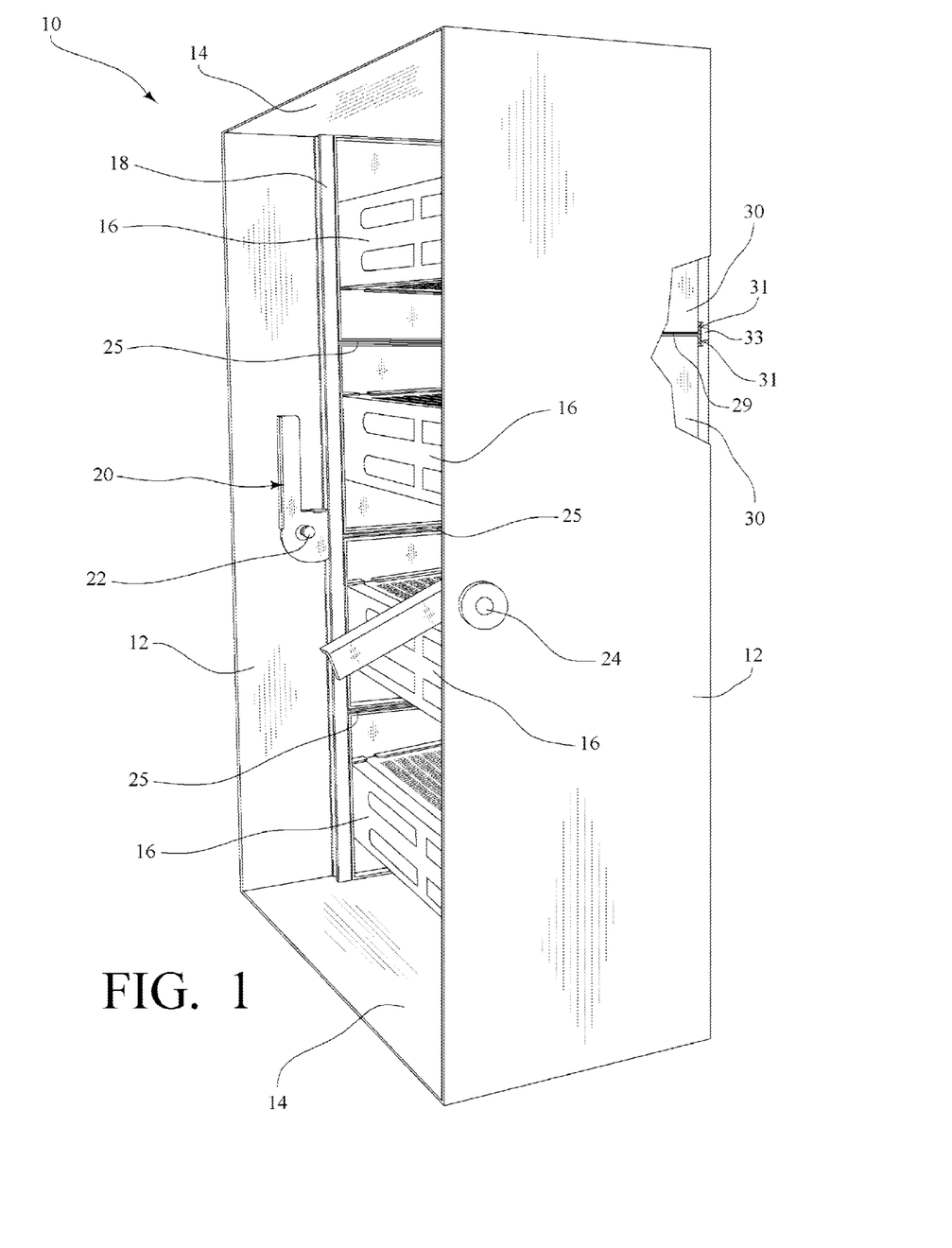
FIG. 1 is a perspective view of an embodiment of the front access frame sealing mechanism for filter cassettes of the present invention showing component parts in a filter cassette housing.

FIG. 1 shows an embodiment of a front access frame sealing mechanism within filter cassette housing 10. Filter cassette housing 10 has two opposing sidewalls 12 and top and bottom walls 14. At least one post 22 extends inwardly from each sidewall 12, preferably centrally oriented between top and bottom walls 14. In the embodiment shown, there is a single post 22 on each sidewall. When a plurality of posts 22 extend inwardly from each sidewall, they are preferably substantially equidistantly spaced between top and bottom walls 14. Shown here is post stem retainer 24 retaining post 22 in sidewall 12. It is to be understood that a post 22 may be retained within sidewalls 12 with a variety of means such as welding or the use of fasteners, or other means as is known in the art. At least one filter cassette 16 is housed within filter cassette housing 10 wherein each filter cassette 16 has a pair of rectangular side panels 30. Side panels 30 are rectangular in shape and have a lower edge 29 and a front edge 26 (shown in FIG. 2). Filter cassettes 16 are supported within housing 10 with lower edges 29 slidingly engaging support flanges 25. A flange 25 extends inward from each sidewall 12, substantially parallel with one another and vertically aligned. At the rear of housing 10 are horizontal cross members 33 aligning with an upper and lower sealing surface of each filter cassette 16 and having gaskets 31 providing a rear seal between rear upper and lower horizontal edges of filter cassette 16 to housing 10. Camming retainer 20 is mounted for rotation on post 22 having a portion rotatingly engaging sealing channel 18. The rotation of camming retainer 20 into a locking position provides a sealing force against sealing channel 18 which pushes against and distributes the sealing force against each filter cassette 16. The sealing force applied to each filter cassette 16 causes each filter cassette 16 in the back of a series to engage the respective gaskets 31 between the sealing surfaces of cassettes 16 and the rear housing cross members 33 thereby forming a seal therebetween with gaskets 31.

Figure 2:
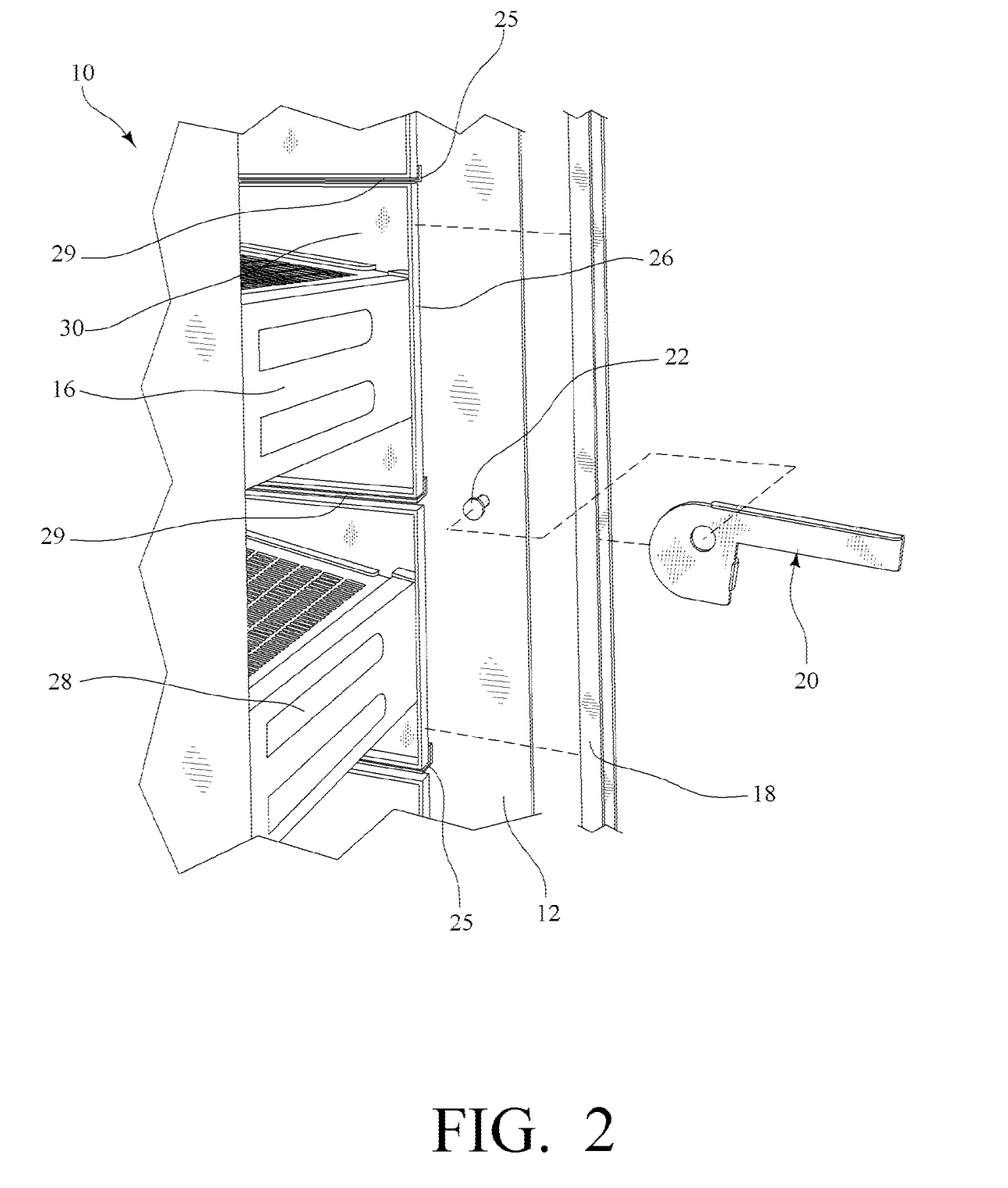
FIG. 2 is an exploded view of the front access frame sealing mechanism for filter cassettes of FIG. 1 showing the interrelationship of component parts.

FIG. 2 shows an exploded view of the component parts of the front access frame sealing mechanism for the filter cassettes of FIG. 1. The front access frame sealing mechanism is comprised of sealing channel 18, post 22, and camming retainer 20. Extending inwardly from each sidewall 12 is a filter cassette support flange 25 for the serial placement of each filter cassette 16. At least one filter cassette 16 is slidingly placed on each set of inwardly extending support flanges 25. Optionally more than one filter cassette 16 may be placed on each set of support flanges 25 providing filtration in series. At the upstream end of filter cassette 16 is a fill aperture having a fill aperture cover 28 for each filter media bed in each filter cassette 16. Each filter cassette 16 has a front edge surface 26 on side panels 30 at each side for engaging a sealing channel 18. Sealing channel 18, shown removed from housing 10, has a "U" cross-sectional configuration with a linear rear surface for engaging each front edge surface 26 of each cassette 16 or the first cassette placed in series if more than one filter cassette 16 is placed on each pair of inwardly extending flanges 25. At least one post 22 extends inwardly from each sidewall 12 of filter cassette housing 10. Post 22 has a head with a greater diameter than the diameter of the extending body. Camming retainer 20 is placed about post 22 with a camming portion extending into the groove in sealing channel 18. Camming retainer 20 is then rotated downward, in the embodiment shown, applying a sealing force against sealing channel 18. This sealing force is transferred to each filter cassette 16 placed in series providing a sealing force against a gasket 31 between a sealing surface on the last filter cassette 16 in the series and a cross member 33 in the rear portion of filter housing 10. Such a sealing force substantially prevents blow by of gases from above or below filter cassettes 16.

Figure 3:
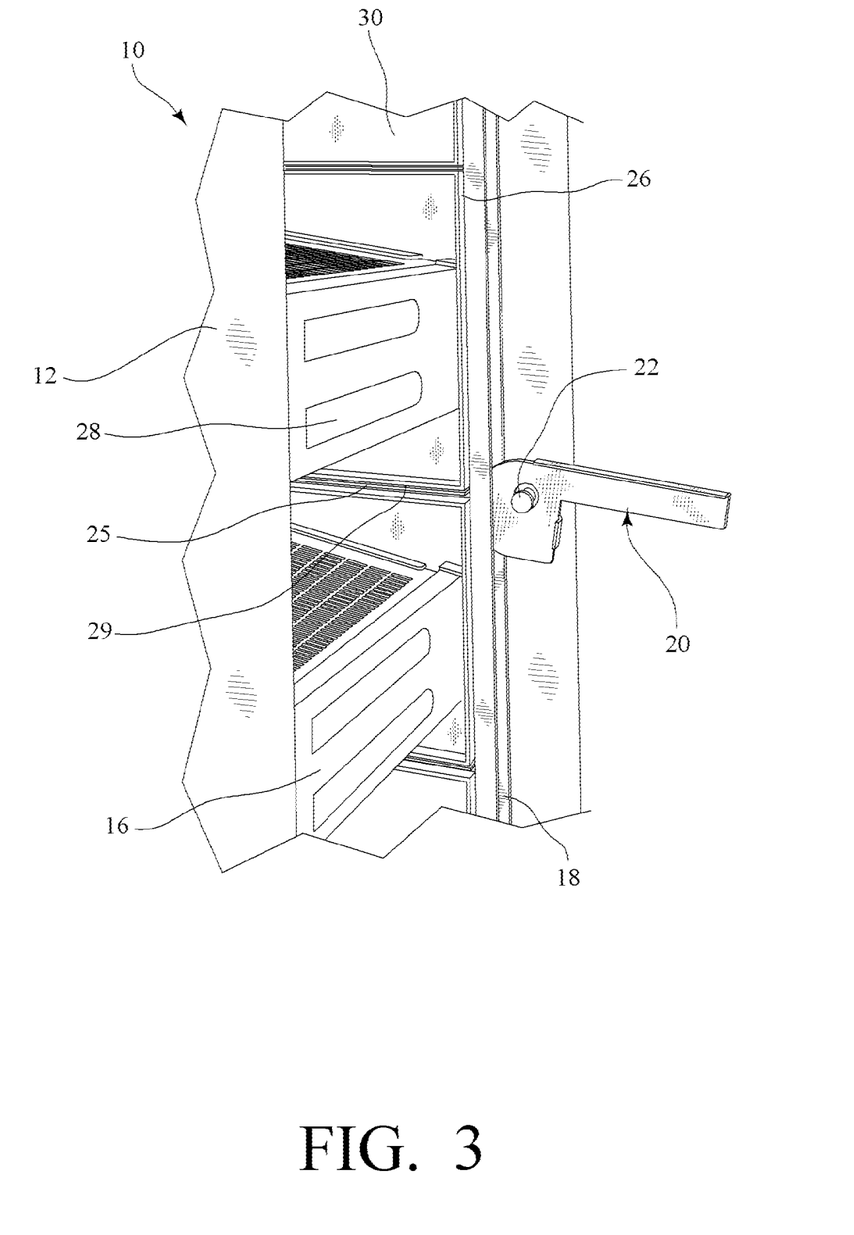
FIG. 3 is a cut-away view of the front access frame sealing mechanism for filter cassettes of FIG. 1 in an in use position.

FIG. 3 shows the front access frame sealing mechanism for filter cassettes in an in use position. At least one filter cassette 16 is placed on each pair of inwardly extending support flanges 25 with a front edge surface 26 of side panel 30 along each sidewall 12 of housing 10. Fill aperture covers 28 are on the upstream side of filter cassettes 16 having front edge surfaces 26 engaging sealing channels 18, one adjacent each sidewall 12 of housing 10. Each sealing channel 18 has a "U" cross-sectional configuration with a linear rear surface engaging each front edge surface 26 of each upstream cassette 16. Post 22 extends inwardly from sidewall 12 of filter cassette housing 10 having a head extending into aperture 36 (shown in FIG. 4) in camming retainer 20. Camming retainer 20 has a portion of the cam residing in the groove or channel in sealing channel 18.

Figure 4:
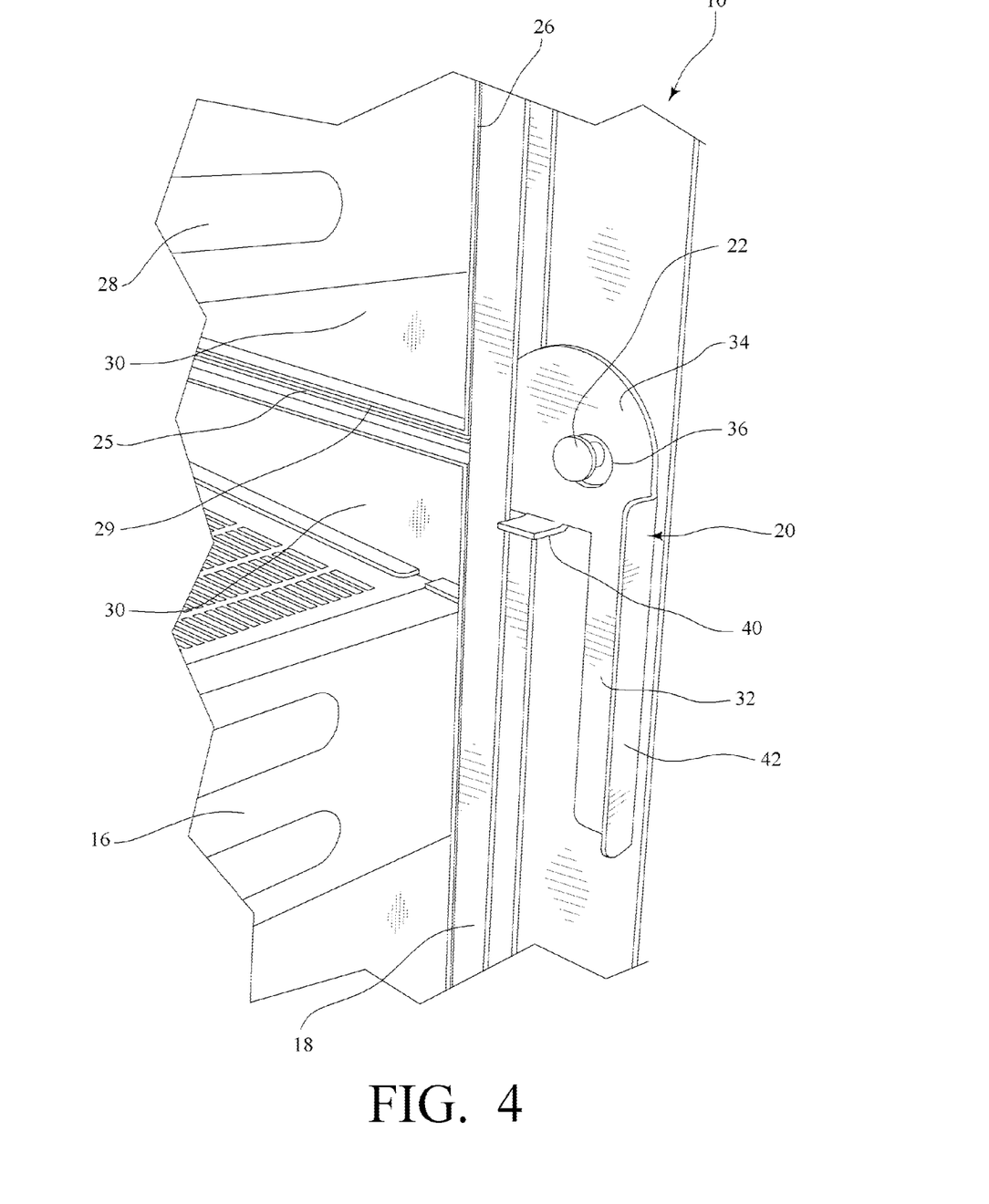
FIG. 4 is a cut-away view of the front access frame sealing mechanism for filter cassettes of FIG. 1 in an sealing position.

FIG. 4 shows the front access frame sealing mechanism for filter cassettes in a sealing position. At least one filter cassette 16 is slidingly engaged with lower edges 20 of side panels 30 on each pair of inwardly extending support flanges 25 with a front edge surface 26 adjacent each sidewall 12 of housing 10. Fill aperture covers 28 are on the upstream side of filter cassettes 16 having front edge surfaces 26 engaging sealing channels 18. Each sealing channel 18 has a linear rear surface engaging each front edge surface 26 of each side panel 30 and a front surface having a groove therein. At least one post 22 extends inwardly from each sidewall 12 of filter cassette housing 10 having a camming retainer 20 supported thereon. In this embodiment, camming retainer 20 is in a downwardly rotated sealing position with a flat portion of the cam residing in the groove or channel of sealing channel 18. Inwardly extending stop 40 rests against sealing channel 18 while handle portion 32 points downward. Handle portion 32 has inward extending flange 42, extending from a longitudinal edge of handle 32, providing surfaces for manual installation and removal as well as strength to camming retainer 20. In the embodiment shown, flange 42 extends the longitudinal edge of handle 32 proximate the curved portion of cam 34, however, it is to be understood that flange 42 may extend from the other longitudinal edge of handle 32 and be within the scope of the present invention. In the downwardly rotated position a sealing force is held against sealing channel 18 and transferred to gasket 31 or other seal between a sealing surface on a downstream side of the last filter cassette 16 in the series and a cross member 33 having gaskets 31 or other sealing means as is known in the art, in the rear portion of the filter housing.

The sealing mechanism for a plurality of filter cassettes 16 within filter cassette housing 10 is shown in FIG. 4. Housing 10 has at least one pair of parallel flanges 25 extending inward from opposing sidewalls 12. Filter cassettes 16 have rectangular side panels 30 with a bottom edge 29 that slidingly cooperate with parallel flanges 25. Sidewalls 12 having at least one pair of retaining posts 22 extending inwardly from opposing sidewalls 12 of housing 10. A pair of elongated sealing channels 18 have a flat side for cooperating with side panels 30 of filter cassette 16 and an opposite channel side for receiving retaining clip 20. Retaining clip or camming retainer 20 has a thickness less that the width of the channel in sealing channels 18. Retaining clip or camming retainer 20 has a cam end with an outer edge, an outer camming portion in the outer edge has a first end and a second end. Aperture 36 in the cam end is more proximate the first end of the camming portion than the second end. A flat edge section, shown locked in channel 18, is in the outer edge of the cam end adjacent the second end of the camming portion. Handle 32 extends from the cam end adjacent the first end of the camming portion of the outer edge. Handle 32 and cam end 34 have a common plane wherein handle 32 has a longitudinally extending flange 42 extending outward from the common plane, stop 40 also extends outward from the common plane between the flat edge section of the outer edge and handle 32.

Figure 5:
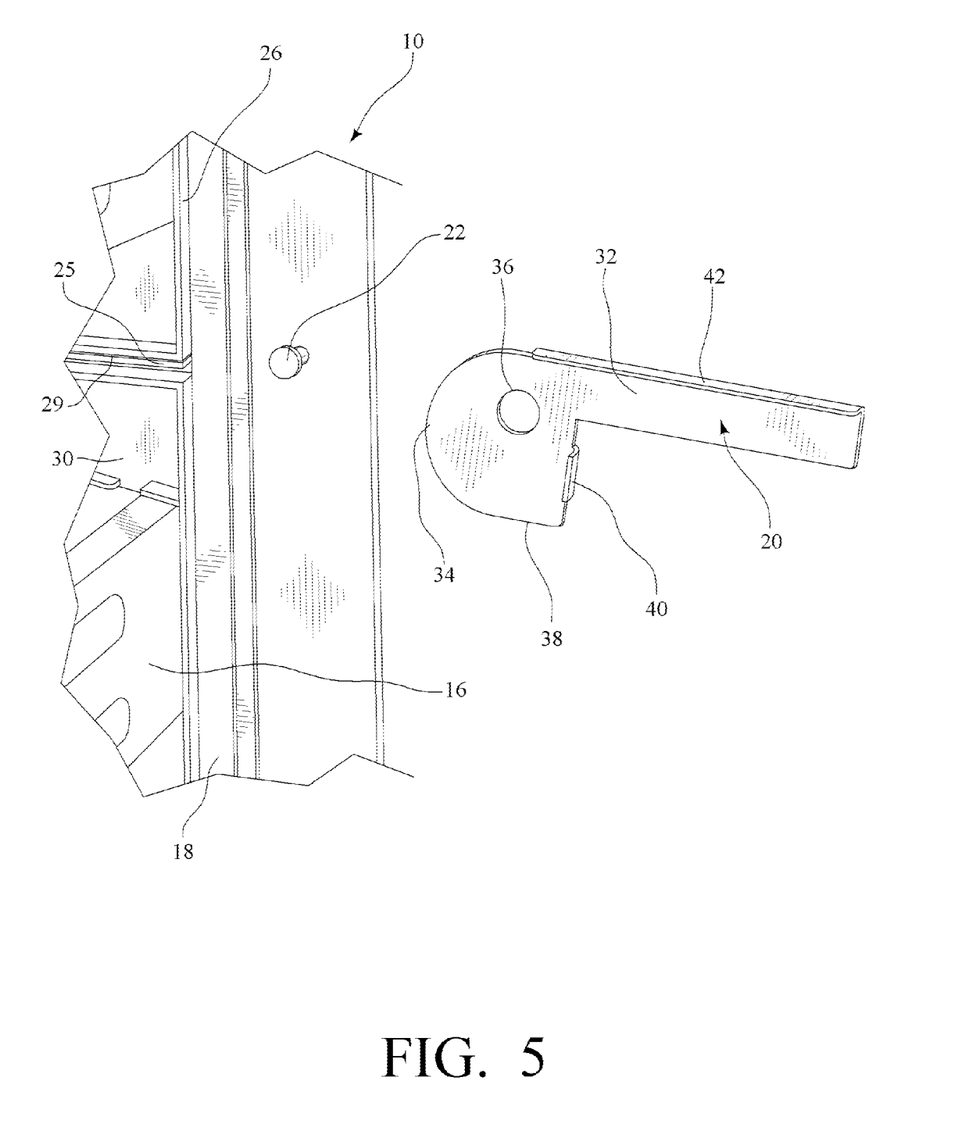
FIG. 5 is a cut-away view of the front access frame sealing mechanism for filter cassettes of FIG. 1 showing the cam retainer.

FIG. 5 shows an embodiment of cam retainer 20 removed from post 22. Preferably, cam retainer 20 is of a single piece and more preferably formed from sheet metal. In the embodiment shown, cam retainer 20 has handle 32 having an inwardly extending flange 42 allowing gripping and rotation to a downward sealing position about post 22 and to an upward non-sealing position. Cam 34 has a centrally oriented aperture 36 with a diameter greater than the diameter of a head on post 22. Post 22 passes through aperture 36 and cam retainer 20 is removeably retained on post 22 with the head thereon. In this position, cam 34 rests in the channel in sealing channel 18. Flat edge section 38 of cam 34 is adjacent sealing channel 18 when cam retainer is in a sealing position about post 22. A force exerted by gasket 31 between rear cross-member 33 of housing 10 and the downstream sealing side of downstream cassette 16 causes front edge surface 26 to be forced adjacent flat section 38 holding it in a sealing position about post 22. Stop 40 extends inward from cam 34 and becomes adjacent sealing channel 18 when cam retainer 20 is in a sealing position. It is to be understood that camming retainer 20 may have a variety of configurations. For example, stop 40 and flange 42 could extend in an opposite direction as shown wherein camming retainer 20 would rotate upward to engage channel 18 when in a sealing position. Alternatively, the embodiment of camming retainer 20 shown may be used on the right side of housing 10 while a camming retainer having stop 40 and handle portion 32 extending in an opposite direction could be used on the left sidewall 12 of housing 10 thus both camming retainers 20 would rotate downwardly to a sealing position. Preferably, camming retainer 20 has the same configuration, regardless of the sidewall 12 of housing 10 to which it is engaged. Hence, camming retainer 20 would rotate downward on one sidewall 12 and upward on the other sidewall 12 to lock into a sealing position. Such uniformity of configuration reduces production and inventory costs.

Figure 6:
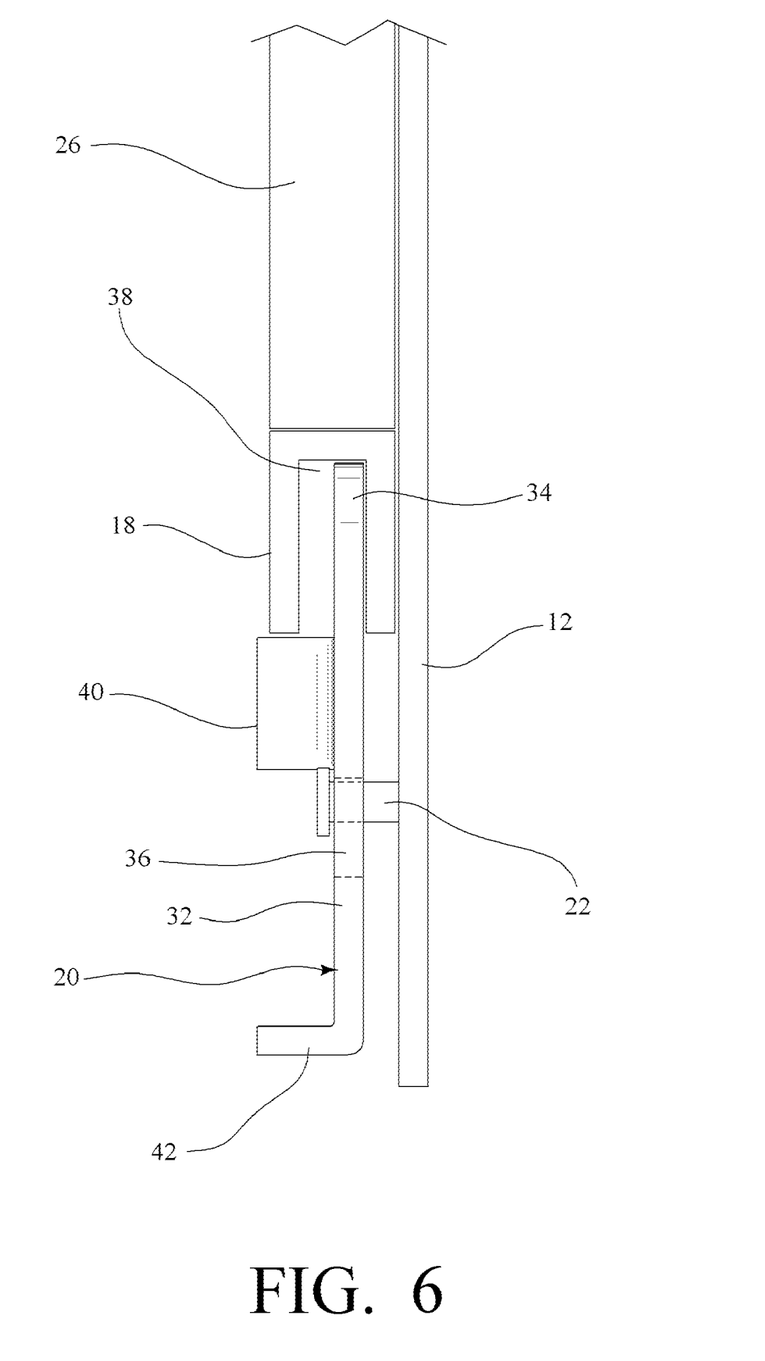
FIG. 6 is top view of the front access frame sealing mechanism for filter cassettes of FIG. 1 showing the cam retainer in a sealing position.

FIG. 6 shows a top view of cam retainer 20 in a sealing position about post 22 having cam 34 residing in channel 18. Front edge surface 26 of side panel 30 is adjacent sidewall 12 of housing 10 and is engaging a linear side of sealing channel 18. Flat edge section 38 of cam 34 resides adjacent the channel in sealing channel 18. Stop flange 40 rests adjacent sealing channel 18. Post 22 extends from sidewall 12 and through aperture 36 which is oriented in cam 34. Handle portion 32 has an optional inwardly extending flange 42 allowing easy rotation of cam retainer 20 about post 22.

Figure 7:
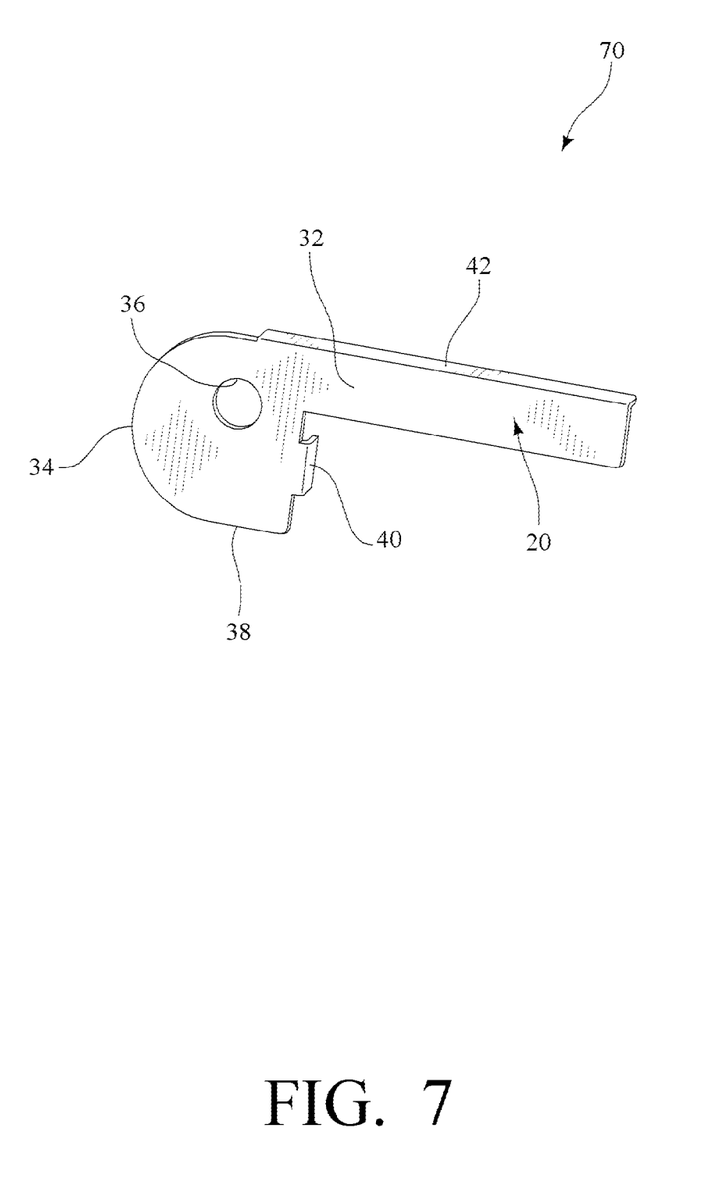
FIG. 7 is a perspective view of an alternative embodiment of the cam retainer.

FIG. 7 shows a perspective view of cam retainer 70 which is an example of an alternative embodiment of cam retainer 20 shown in FIG. 1. Preferably, cam retainer 70 is of a single material. In this embodiment, stop 40 and flange 42 extend in an opposite direction as the embodiment shown in FIG. 1. When cam retainer 70 is mounted on right sidewall 12 and cam retainer 20 is mounted on left sidewall 12, both camming retainers 20 and 70 would rotate upward to engage channel 18 when in a sealing position. Alternatively, an embodiment wherein camming retainer 20 is used on the right side of housing 10 while a camming retainer 70 is used on the left sidewall 12 of housing 10, both camming retainers 20 and would rotate downwardly to a sealing position. Preferably, both camming retainers used have the same configuration, regardless of the sidewall 12 of housing 10 to which it is engaged. Hence, camming retainer 20 or 70 would rotate in opposite directions on one sidewall 12 to lock into a sealing position. Such uniformity of configuration reduces production and inventory costs.

The novel front access frame sealing mechanism for filter cassettes of the instant invention provides a sealing mechanism for filter cassettes within a housing greatly reducing blow by of gases around the top and bottom sealing surfaces of the filter cassettes thus increasing filtration efficiency. A camming retainer rotates about a post extending inwardly from each sidewall of a housing exerting a force on a sealing channel which transfers the force to a cassette and on to gasket 31 thus sealing downstream sides of filter media beds within a cassette against cross member 33 at the rear of the housing.

We claim:

1. A sealing mechanism for a plurality of filter cassettes within a filter cassette housing comprising, said housing having at least one pair of parallel flanges extending inward from opposing sidewalls, said filter cassettes having rectangular side panels with a bottom edge that slidingly cooperate with said parallel flanges, said opposing sidewalls having at least one pair of retaining posts extending inwardly from said opposing sidewalls of said housing, a pair of elongated sealing channels having a flat side for cooperating with said side panels and an opposite channel side for receiving a retaining clip, said retaining clip having a cam end with an outer edge, an outer camming portion in said outer edge having a first end and a second end, an aperture in said cam end, said aperture being more proximate said first end of said camming portion than said second end, a flat edge section in said outer edge of said cam end adjacent said second end of said camming portion, a handle extending from said cam end adjacent said first end of said camming portion of said outer edge, said retaining clip having a thickness less than the width of said channel.

2. The sealing mechanism of claim 1 wherein said handle and said cam end have a common plane, said handle having a longitudinally extending flange extending outward from said common plane, said retaining clip having a stop extending outward from said common plane between said flat edge section of said outer edge and said handle.

3. A sealing mechanism comprising a filter cassette housing, said housing having a plurality of walls wherein at least one pair of said plurality of walls have an air inlet and an air outlet defining a flow path, a least one post disposed on one of said plurality of walls and spaced between an upper end and a lower end of said one of said plurality of walls, a sealing channel disposed adjacent said side walls and adjacent said at least one post, a retaining mechanism having a camming edge and a locking edge, said retaining mechanism engaging said sealing channel, said sealing channel engaging a filter cassette and applying a sealing force on said filter cassette.

4. The sealing mechanism of claim 3 further comprising a pair of support flanges extending inwardly from said at least one pair of plurality of walls.

5. The sealing mechanism of claim 4, said filter cassette slidably positioned on said pair of support flanges.

6. The sealing mechanism of claim 3 said sealing mechanism inhibiting blow by gases from passing filter cassette.

7. The sealing mechanism of claim 3 further comprising a sealing gasket within said filter cassette housing.

8. The sealing mechanism of claim 7, said sealing gasket engaging said filter cassette when said retaining mechanism is engaging said sealing channel in a sealing position.

9. The sealing mechanism of claim 7, said sealing gasket located in a rear area of said filter cassette housing.

10. A sealing mechanism for a filter cassette housing, comprising:
   a filtration housing having a top, a bottom, and opposed sidewalls extending between said top and said bottom;
   at least one flange extending from at least one of said opposed sidewalls, said at least one support flange capable of supporting at least one filter cassette;
   a sealing channel extending adjacent said at least one support flange and movable between a first position and a second position to one of engage or disengage said at least one filter cassette;
   at least one post extending from said opposed sidewall;
   a camming retainer mechanism positionable on said at least one post, said camming retainer mechanism having a camming edge which engages said sealing channel to move said sealing channel between said first position and said second position.

11. The sealing mechanism of claim 10 wherein said sealing channel applies force to said at least one filter cassette in one of said first position and said second position.

12. The sealing mechanism of claim 11, wherein one of said first position and said second position result in application of a sealing force to said filter cassette.

13. The sealing mechanism of claim 12 wherein the other of said first position and said second position result in removal of said sealing force to said filter cassette.

14. The sealing mechanism of claim 10, said camming retainer mechanism having a handle.

15. The sealing mechanism of claim 10, said camming retainer mechanism being removable from said post.

16. The sealing mechanism of claim 15, said camming retainer mechanism pivoting about said post.

* * * * *